United States Patent [19]
Heilmann et al.

[11] 4,379,201
[45] Apr. 5, 1983

[54] MULTIACRYLATE CROSS-LINKING AGENTS IN PRESSURE-SENSITIVE PHOTOADHESIVES

[75] Inventors: Steven M. Heilmann, North St. Paul; John D. Moon, Hastings, both of Minn.

[73] Assignee: Minnesota Mining and Manufacturing Company, St. Paul, Minn.

[21] Appl. No.: 249,116

[22] Filed: Mar. 30, 1981

[51] Int. Cl.³ ............................................. B05D 3/06
[52] U.S. Cl. ............................ 428/345; 204/159.22; 204/159.23; 427/54.1; 428/355
[58] Field of Search ............... 427/54.1, 44; 428/345, 428/355; 204/159.22, 159.23

[56] References Cited

U.S. PATENT DOCUMENTS

| | | | |
|---|---|---|---|
| 3,661,618 | 5/1972 | Brookman et al. | 427/44 |
| 4,069,123 | 1/1978 | Skoultchi et al. | 427/54.1 |
| 4,150,170 | 4/1979 | Lazear et al. | 427/54.1 |
| 4,181,752 | 1/1980 | Martens et al. | 427/54.1 |

*Primary Examiner*—John H. Newsome
*Attorney, Agent, or Firm*—Cruzan Alexander; Donald M. Sell; Richard E. Brink

[57] ABSTRACT

Pressure-sensitive adhesive tape having a photopolymerized acrylate polymer adhesive which has been crosslinked by a polyacrylic-functional crosslinking monomer such as trimethyol-propane triacrylate.

19 Claims, 2 Drawing Figures

MULTIACRYLATE CROSS-LINKING AGENTS IN PRESSURE-SENSITIVE PHOTOADHESIVES

TECHNICAL FIELD

This invention concerns pressure-sensitive adhesive tape.

BACKGROUND ART

U.S. Pat. No. Re. 24,906 (Ulrich) concerns pressure-sensitive adhesive copolymer of about 88–97 parts of acrylic acid ester of non-tertiary alcohol, the alkyl groups of which have an average of 4–12 carbon atoms in the alkyl group, and correspondingly about 12–3 parts by weight of at least one modifying copolymerizable monomer such as acrylic acid, itaconic acid or acrylamide. A tape coated with the copolymer exhibits excellent adhesion and holding power, and the adhesive coating experiences no observable deterioration even after the tape has been stored for a number of years.

While the tape coatings of the Ulrich patent are applied from solution, U.S. Pat. No. 3,661,618 (Brookman et al.) concerns a process wherein a solvent-free coating primarily comprising an acrylic ester monomer of Ulrich is polymerized to a tacky state by being subjected to a beam of high energy electrons. The coating preferably includes a small amount of a polyfunctional acrylate or methacrylate such as diethylene glycol diacrylate which crosslinks the acrylic acid ester, thus improving the cohesive strength of the tacky coating. The use of an electron beam not only eliminates the need for a solvent but also eliminates problems due to evaporation of the solvent.

U.S. Pat. No. 4,181,752 (Martens et al.) concerns pressure-sensitive adhesives made from the same liquid monomers as in the Ulrich patent. Solvent-free coatings of those monomers are subjected to radiation having wavelengths of 3000–4000 Å at a rate of 0.1 to 7 milliwatts per square centimeter, while controlling the amount of radiation of shorter wavelengths to not more than about 10% of the amount of energy in the 3000–4000 Å range. As in the Brookman patent, the Martens process eliminates solvent-evaporation problems.

The Martens patent teaches that the pressure-sensitive adhesive layer may be crosslinked, particularly where it is desired to increase the cohesive strength of the adhesive without unduly affecting its compliance. This can be achieved by utilizing a photoactive crosslinking agent in conjunction with the photoinitiator. Preferred as the photoactive crosslinking agent are certain chromophore-substituted vinylhalomethyl-s-triazines such as 2,4-bis(trichloromethyl)-6-p-methoxystyryl-s-triazine which is hereinafter called "MOST". Because these crosslinkers contain chlorine, they can have a corrosive effect and thus are considered unsuitable for corrosion-sensitive applications such as general electrical-insulating uses. Because it can be difficult to match the peak energy-absorbing wavelength of the photoactive crosslinking agent to that of the primary photoinitiator, it may be necessary to use an ultraviolet source which is not optimum for either of these. Because photoactive triazines such as MOST are highly absorptive of ultraviolet radiation, it has not been considered to be feasible to polymerize coatings which are greater than 0.25 mm in thickness. Also MOST imparts a yellow color which is undesirable for some uses.

In the periodical Chemtech, September 1974, pages 539–543, an article entitled "Radiation Polymerization for Pressure-Sensitive Adhesives" by Dowbenko et al. concerns polymerization of coatings of liquid monomers of the Ulrich patent by electron beam or ultraviolet radiation. The Dowbenko article states that difunctional "monomers of the ethylene glycol diacrylate type can also be used in some cases to increase certain properties of the adhesive, probably by crosslinking" (page 540).

U.S. Pat. No. 4,150,170 (Lazear et al.) concerns the use of ultraviolet radiation to polymerize solvent-free monomeric compositions to a pressure-sensitive adhesive state. The novelty resides in a unique combination of photoinitiators, and it is said that these may be used with any of the compositions previously used in ultraviolet curable systems. Among a host of materials which are said to have been used in previous systems are various acrylic monomers, and with these may be used polyfunctional materials such as ethylene glycol diacrylate. Of these, the examples employ only hexanediol diacrylate.

Of pressure-sensitive adhesive tapes specifically identified in the above-discussed prior art, the tape affording the highest cohesive strength while still having good resistance to peelback is believed to be tape of Example 27 of the Martens patent. Its adhesive was obtained from a mixture of 98 parts isooctyl acrylate, 2 parts acrylic acid, about 0.25 weight percent of benzoin ethyl ether and 0.15 weight percent of MOST. The reported peel adhesion from glass was greater than 0.8 kilogram per centimeter and shear strength exceeded 10,000 minutes [measured by pressing a ½-inch square (1.25 cm square) area of tape against a vertical stainless steel plate and hanging a 1-kg weight on the tape].

There has long been a need for a pressure-sensitive adhesive tape which could be made without evolving solvent and would have resistance to peel forces and a cohesive strength at least as good as those of the MOST-based tape of the Martens patent while being less corrosive.

DISCLOSURE OF INVENTION

The invention concerns a method of making pressure-sensitive adhesive tape which is similar to that of the Martens patent in that a coatable mixture or syrup is (1) coated onto a backing member and (2) exposed to ultraviolet radiation to polymerize the mixture to a pressure-sensitive adhesive state. As in the Martens patent, the syrup comprises (a) partially polymerized acrylic acid ester of non-tertiary alcohol, the alkyl groups of which have an average of about 4 to 14 carbon atoms, said acrylic acid ester being per se polymerizable to a sticky, stretchable, elastic adhesive mass and (b) a photoinitiator. Also as in the Martens patent, component (a) preferably includes at least one copolymerizable monomer such as acrylic acid, methacrylic acid, itaconic acid, acrylamide, methacrylamide, an N-acryloylamino acid, and N-vinyl-2-pyrrolidone in amounts up to about 12% by weight of the component (a).

The pressure-sensitive adhesive tape of the invention affords a resistance to peelback and a shear strength at least equal to the values reported for the one crosslinked example of the Martens patent, namely, Example 27, while: (1) being substantially noncorrosive and thus suitable for corrosion-sensitive applications, (2) requiring the use of only one photoinitiator, thus permitting the wavelength of the ultraviolet source to be closely matched to the peak energy-absorbing wavelength of the photoinitiator, (3) permitting the polymerization of coatings of thicknesses up to at least 2.5 mm, as compared to the practical upper limit of about 0.25 mm when MOST is used, and (4) being conveniently produced without yellow color.

Pressure-sensitive adhesive tapes of the invention are believed to be the first substantially noncorrosive tapes which have both an Adhesion Value, as described below, in excess of 83 N/dm and a Shear Value, as described below, in excess of 1250 minutes. The achievement of such high performance is considered to be of great importance.

These advantages are achieved by substituting for the photoactive crosslinking agents of the Martens patent a polyacrylic-functional crosslinking monomer having less than 10 atoms in the chain between vinyl groups and in an amount providing about 0.5 to $5 \times 10^{-5}$ diacrylate equivalent per gram of the above-identified component (a). Useful polyacrylic-functional crosslinking monomers include trimethylolpropane triacrylate, pentaerythritol tetracrylate and 1,2-ethylene glycol diacrylate. The diacrylate equivalent of a triacrylic-functional crosslinking monomer is moles triacrylate times ⅔ and of a tetracrylate-functional crosslinking monomer is moles tetracrylate times ½. At less than about $0.5 \times 10^{-5}$ diacrylate equivalent per gram, the polymer may not become sufficiently crosslinked to provide high cohesive strength. At above about $5 \times 10^{-5}$ diacrylate equivalent per gram, the polymer might become so highly crosslinked as to be less tacky than desirable, as might be evidenced by unduly low or erratic resistance to peelback forces.

Any photoinitiators of the benzoin ether type disclosed in the Martens patent are useful in the present invention including the benzoin ethers (such as benzoin methyl ether or benzoin isopropyl ether), substituted benzoin ethers (such as anisoin methyl ether), substituted acetophenones (such as 2,2-diethoxyacetophenone and 2,2-dimethoxy-2-phenylacetophenone), and substituted alpha-ketols (such as 2-methyl-2-hydroxypropiophenone). They are preferably used in amounts which as dissolved provide about 0.01 to 2 (more preferably 0.1 to 0.5) parts per 100 parts by weight of the aforementioned component (a).

As in the Martens patent, the monomer mixtures generally are too low in viscosity to be handled conveniently but can be prepolymerized prior to coating, thus forming a syrup of coatable viscosity such as 300 to 20,000 centipoises (Brookfield) at ordinary room temperature.

In the current state of the art, photopolymerization of thin coatings is carried out in an inert atmosphere. Any inert atmosphere such as nitrogen, carbon dioxide, helium or argon is suitable and a little oxygen can be tolerated. A sufficiently inert atmosphere can be achieved by covering a layer of the photoactive mixture with a plastic film which is transparent to ultraviolet radiation and irradiating through that film in air.

In addition to the ingredients mentioned above, the photopolymerizable monomer mixtures may include certain other materials such as pigments, tackifiers and reinforcing agents. However, the addition of any such material adds complexity and hence expense to an otherwise simple, straightforward, economical process and is not preferred except to achieve specific results.

Pressure-sensitive adhesive tapes of the examples and the comparative tapes discussed below employed as the backing member biaxially-oriented polyethylene terephthalate film having a thickness of about 2 mils (50 micrometers). Each tape was slit to a width of ½ inch (1.27 cm) and had an adhesive thickness of about 2 mils (50 micrometers) unless otherwise stated. The tapes were tested for Adhesion Value and Shear Value as follows:

Adhesion Value

Tape is adhered by its adhesive to a glass plate under the weight of a 4.5-kg hard rubber roller. Peelback at 180° is measured at 50% relative humidity and 21° C. by attaching the free end of the tape to a scale and moving the glass plate away from the scale at a rate of about 230 centimeters per minute. The average of three specimens of each tape is the Adhesion Value and is reported in Newtons per decimeter.

Shear Value

A strip of tape is adhered by its adhesive to a stainless steel plate under the weight of a 4.5-kg hard rubber roller with a free end of the tape extending beyond the plate and the adhesive contact area being ½ inch by ½ inch (1.27 cm by 1.27 cm). The plate is immediately positioned 2° from the vertical to prevent peeling, and a 1750-gram mass is suspended from the free end. The time at which the mass falls is called "Shear Test" and is reported as "5000+" if the tape has not failed after 5000 minutes. With each Shear is indicated the mode of failure as follows:

PO=Pop-off, i.e., 75-100% adhesive failure from steelplate.

CoPO=Cohesive Pop-off: adhesive split leaving >25% residue on both surfaces.

CoF=Cohesive Failure: adhesive covering 100% of contacted area on both stainless steel substrate and polyester backing.

FB=Failure from Backing: 75-100% adhesive failure from the polyester backing.

Three specimens of each tape are tested and the Shear Tests are averaged to obtain the Shear Value. Any Shear Test involving Pop-off is not included in the average, because such failures have been found not to be indicative of cohesive strength. If any of the three Shear Tests exceeds 5000 minutes, the Shear Value is 5000 minutes.

BRIEF DESCRIPTION OF DRAWINGS

Why the polyacrylic-functional monomer should have less than 10 atoms in the chain between polymerizable vinyl groups is evident from the drawing wherein.

Figure 1:
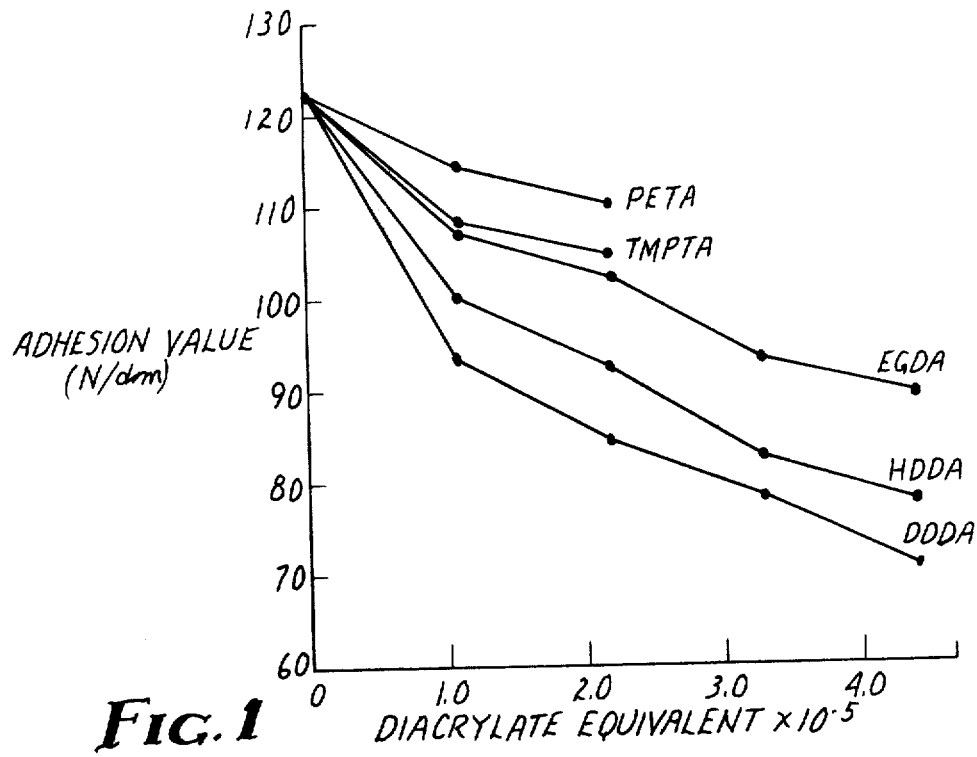
FIG. 1 is a graph showing Adhesion Values of tapes made using various polyacrylic-functional monomers at various concentrations and FIG. 2 is a graph showing Shear Values of the same tapes from which the graph of FIG. 1 was generated.

In the following examples, all parts are given by weight.

COMPARATIVE EXAMPLE A

A mixture of
90 parts of isooctyl acrylate
10 parts of acrylic acid
0.1 part of benzoyl peroxide
was sparged with nitrogen and heated to 65° C. with vigorous stirring. When the viscosity had increased to what was judged to be a syrup of coatable viscosity, oxygen was bubbled into the syrup to terminate the polymerization reaction. The syrup contained 7.42% copolymer (M$_W$=8.4 million) as determined by change in refractive index and exhibited a Brookfield viscosity at 22° C. of 2884 centipoises. The change in refractive index occurs linearly with conversion of the unsaturated moiety. See for example, discussions about the method in *Polymerization at Advanced Degrees of Conversion*, G. P. Gladyshev and K. M. Gibov, Keter Press, Jerusalem, 1970.

A photoinitiator benzoin ethyl ether (0.25 part) was dissolved in the syrup immediately prior to coating. The syrup was knife-coated onto a polyethylene terephthalate film at an orifice setting of 4 mils (100 micrometers) to produce a coating weight of between 19.3 and 19.7 grains per 24 square inches of adhesive [8.1 to 8.3 mg/cm$^2$]. The coating was immediately passed though an inert (nitrogen) chamber and irradiated with a bank of 40-watt fluorescent near-ultraviolet lamps (F40T12/BL Sylvania) to provide an exposure of 540 millijoules. The lamp-to-coating distance was 12 inches (30 cm) and the light passed through a Pyrex glass window of ⅛ inch (0.3 cm) thickness. There was substantially no radiation below 310 nm. Conversion to polymer exceeded 97.5%.

EXAMPLES 1 TO 8 AND COMPARATIVE EXAMPLES B TO I

A series of tapes was prepared as in Comparative Example A except that various polyacrylic-functional crosslinking monomers were added in various amounts to the syrup after it had cooled to room temperature and before adding the photoinitiator, as indicated below. The various polyacrylic-functional crosslinking monomers were

|  | Here Called | Number of atoms in chain between polymerizable vinyl groups |
|---|---|---|
| trimethylolpropane triacrylate | TMPTA | 7 |
| pentaerythritol tetracrylate | PETA | 7 |
| 1,2-ethylene glycol diacrylate | EGDA | 6 |
| 1,6-hexanediol diacrylate | HDDA | 10 |
| 1,12-dodecanediol diacrylate | DDDA | 16 |

The amounts of polyacrylic-functional crosslinking monomers used in preparing the examples and the Adhesion Values and Shear Values for the resultant tapes are indicated in the following table.

| Example | Polyacrylic-functional Crosslinking Monomer | Diacrylate Equivalent × 10$^{-5}$ | Adhesion Value (N/dm) | Shear Test (min) | Mode of Shear Failure | Shear Value (min) |
|---|---|---|---|---|---|---|
| A | None |  | 123 | 369 | CoF |  |
|  |  |  |  | 345 | CoF | 358 |
|  |  |  |  | 360 | CoF |  |
| 1 | TMPTA | 1.1 | 108 | 990 | PO |  |
|  |  |  |  | 5000+ | — | 5000 |
|  |  |  |  | 5000+ | — |  |
| 2 | TMPTA | 2.2 | 105 | 5000+ | — |  |
|  |  |  |  | 5000+ | — | 5000 |
|  |  |  |  | 5000+ | — |  |
| 3 | PETA | 1.1 | 114 | 2582 | CoPO |  |
|  |  |  |  | 2881 | FB | 2772 |
|  |  |  |  | 2852 | FB |  |
| 4 | PETA | 2.2 | 110 | 1113 | CoPO |  |
|  |  |  |  | 2113 | CoPO | 5000 |
|  |  |  |  | 5000+ | — |  |
| 5 | EGDA | 1.1 | 107 | 1012 | FB |  |
|  |  |  |  | 1613 | FB | 1546 |
|  |  |  |  | 2012 | CoPO |  |
| 6 | EGDA | 2.2 | 102 | 3930 | FB |  |
|  |  |  |  | 2883 | FB | 3619 |
|  |  |  |  | 4045 | FB |  |
| 7 | EGDA | 3.3 | 93 | 5000+ | — |  |
|  |  |  |  | 5000+ | — | 5000 |
|  |  |  |  | 5000+ | — |  |
| 8 | EGDA | 4.4 | 89 | 5000+ | — |  |
|  |  |  |  | 5000+ | — | 5000 |
|  |  |  |  | 5000+ | — |  |
| B | HDDA | 1.1 | 100 | 49 | PO |  |
|  |  |  |  | 119 | CoPO | 100 |
|  |  |  |  | 81 | CoPO |  |
| C | HDDA | 2.2 | 92 | 345 | CoPO |  |
|  |  |  |  | 78 | CoPO | 166 |
|  |  |  |  | 76 | CoPO |  |
| D | HDDA | 3.3 | 82 | 532 | PO |  |
|  |  |  |  | 132 | CoPO | 809 |
|  |  |  |  | 1486 | CoPO |  |
| E | HDDA | 4.4 | 78 | 5000+ | — |  |
|  |  |  |  | 5000+ | — | 5000 |
|  |  |  |  | 5000+ | — |  |
| F | DDDA | 1.1 | 94 | 517 | FB |  |
|  |  |  |  | 459 | PO | 517 |
|  |  |  |  | 206 | PO |  |
| G | DDDA | 2.2 | 85 | 43 | PO |  |
|  |  |  |  | 66 | PO | 1020 |
|  |  |  |  | 1020 | FB |  |
| H | DDDA | 3.3 | 78 | 5000+ | — |  |
|  |  |  |  | 5000+ | — | 5000 |
|  |  |  |  | 5000+ | — |  |
| I | DDDA | 4.4 | 71 | 129 | PO |  |
|  |  |  |  | 5000+ | — | 5000 |
|  |  |  |  | 5000+ | — |  |

Figure 2:
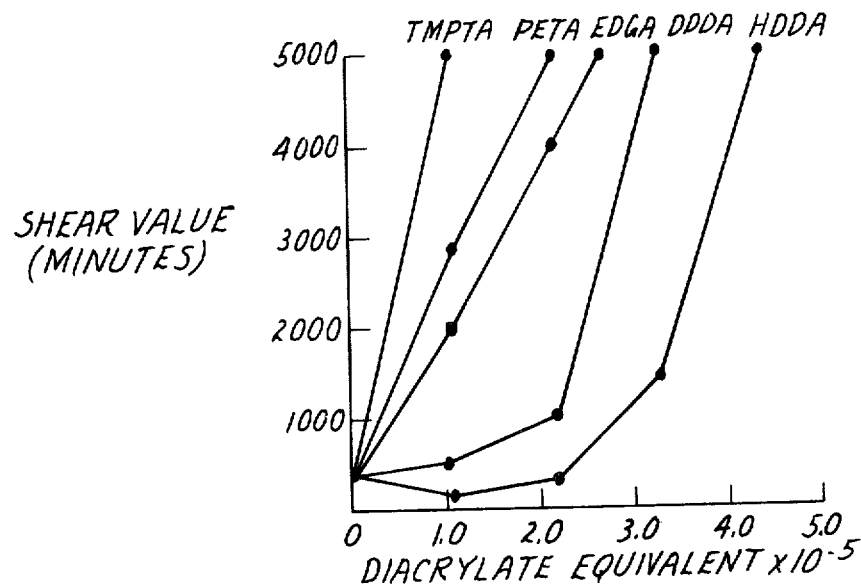

The Adhesion Values and Shear Values reported in the above table are graphically illustrated in FIGS. 1 and 2, respectively, of the drawing, wherein the reference numerals designate the Example numbers. These show the advantage of using polyacrylic-functional crosslinking monomers having less than 10 atoms between polymerizable vinyl groups as opposed to those having a chain of 10 or more atoms. The TMPTA, PETA and EGDA, each of which has a chain of 6 or 7 atoms, provide dramatically improved Shear Values with very little decrease in Adhesion Values. In contrast, HDDA and DDDA, which respectively have chains of 10 and 16 atoms, must be used in relatively large amounts to provide high Shear Values, which amounts provide significantly reduced Adhesion Values.

Instead of using thermal polymerization to convert the monomers to a coatable syrup as in Example A, the partial polymerization may be carried out in an inert atmosphere at room temperature using a photoinitiator and ultraviolet radiation as in Examples 9 and 10.

EXAMPLES 9 AND 10

A glass jar containing a mixture of 90 parts of isooctyl acrylate, 10 parts of acrylic acid, and 0.4 part of 2,2-dimethoxy-2-phenylacetophenone was sparged with nitrogen and sealed. This was irradiated with two 15-watt fluorescent near-ultraviolet lamps until the viscosity was judged to be coatable. After dissolving another 0.11 part of the same photoinitiator, this syrup was coated at different thicknesses onto two strips of polyethylene terephthalate film, and each coating was irradiated as disclosed in Comparative Example A except at exposures of 1000 millijoules. Shear Values were obtained using an anodized aluminum plate instead of stainless steel to provide better adhesion, and hence better tests of cohesive strength.

| EXAMPLE | Thickness (micrometers) | Adhesion Value (N/dm) | Shear Value (minutes) |
|---|---|---|---|
| 9 | 235 | 201 | 5000 |
| 10 | 475 | 175 | 2718 |

We claim:

1. Method of making pressure-sensitive adhesive tape using a coatable mixture which is polymerizable by ultraviolet radiation to a pressure-sensitive adhesive state, which mixture comprises (a) partially polymerized acrylic acid ester of non-tertiary alcohol, the alkyl groups of which have an average of about 4 to 14 carbon atoms, said acrylic acid ester being per se polymerizable to a sticky, stretchable, elastic adhesive mass and (b) a photoinitiator, which coatable mixture is (1) coated onto a backing member and (2) exposed to ultraviolet radiation to polymerize the mixture to a pressure-sensitive adhesive state, wherein the improvement comprises:

dissolved in the mixture is polyacrylic-functional crosslinking monomer having less than 10 atoms in the chain between polymerizable vinyl groups and being present in an amount providing about 0.5 to $5 \times 10^{-5}$ diacrylate equivalent per gram of component (a), thus providing a crosslinked adhesive coating affording an Adhesion Value of at least 83 N/dm and a Shear Value of at least 1250 minutes.

2. Method as defined in claim 1 wherein component (a) includes at least one copolymerizable monomer selected from acrylic acid, methacrylic acid, itaconic acid, acrylamide, methacrylamide, an N-acryloylamino acid, and N-vinyl-2-pyrrolidone in an amount providing up to about 12% by weight of component (a).

3. Method as defined in claims 1 or 2, wherein component (a) is partially polymerized by virtue of a portion of the acrylic acid ester being fully polymerized and dissolved in an unpolymerized or incompletely polymerized portion.

4. Method as defined in claim 1 wherein the polyacrylic-functional crosslinking monomer is ethylene glycol diacrylate.

5. Method as defined in claim 1 wherein the polyacrylic-functional crosslinking monomer is trimethyolpropane diacrylate.

6. Method as defined in claim 1 wherein the polyacrylic-functional crosslinking monomer is pentaerythritol triacrylate.

7. Method as defined in claim 1 wherein the polyacrylic-functional crosslinking monomer is pentaerythritol tetracrylate.

8. A photoactive mixture having a coatable viscosity of 300 to 20,000 centipoises at ordinary room temperature and comprising (a) a partially polymerized acrylic acid ester of non-tertiary alcohol, the alkyl groups of which have an average of about 4 to 14 carbon atoms, said acrylic acid ester being per se polymerizable to a sticky, stretchable, elastic adhesive mass, and (b) a photoinitiator wherein the improvement comprises dissolved in the mixture is polyacrylic-functional crosslinking monomer having less than 10 atoms in the chain between polymerizable vinyl groups and being present in an amount providing about 0.5 to $5 \times 10^{-5}$ diacrylate equivalent per gram of component (a).

9. A photoactive mixture as defined in claim 8, wherein component (a) includes at least one copolymerizable monomer selected from acrylic acid, methacrylic acid, itaconic acid, acrylamide, methacrylamide, an N-acryloylamino acid, and N-vinyl-2-pyrrolidone in an amount providing up to about 12% by weight of component (a).

10. A photoactive mixture as defined in claims 8 or 9 wherein component (a) is partially polymerized by virtue of a portion of the acrylic acid ester being fully polymerized and dissolved in an unpolymerized or incompletely polymerized portion.

11. A photoactive mixture as defined in claims 8 or 9, wherein the polyacrylic-functional crosslinking monomer is ethylene glycol diacrylate.

12. A photoactive mixture as defined in claims 8 or 9, wherein the polyacrylic-functional crosslinking monomer is trimethyolpropane diacrylate.

13. A photoactive mixture as defined in claims 8 or 9, wherein the polyacrylic-functional crosslinking monomer is pentaerythritol triacrylate.

14. A photoactive mixture as defined in claims 8 or 9, wherein the polyacrylic-functional crosslinking monomer is pentaerythritol tetracrylate.

15. Pressure-sensitive adhesive tape comprising a flexible backing member and a pressure-sensitive adhesive coating comprising a copolymer of (a) a partially polymerized acrylic acid ester of non-tertiary alcohol, the alkyl groups of which have an average of about 4 to 14 carbon atoms, said acrylic acid ester being per se polymerizable to a sticky, stretchable, elastic adhesive mass, and (b) at least one copolymerizable monomer selected from acrylic acid, methacrylic acid, itaconic acid, acrylamide, methacrylamide, an N-acryloylamino acid, and N-vinyl-2-pyrrolidone in an amount providing up to about 12% by weight of component (a), which adhesive coating is free from chlorine and other corrosive material, wherein the improvement comprises, the tape has an Adhesion Value as herein defined of at least 83 N/dm and a Shear Value of at least 1250 minutes.

16. Pressure-sensitive adhesive tape as defined in claim 15 wherein said copolymer has been crosslinked by a polyacrylic-functional crosslinking monomer having less than 10 atoms in the chain between polymerizable vinyl groups in an amount providing about 0.5 to $5 \times 10^{-5}$ diacrylate equivalent per gram of component (a).

17. Pressure-sensitive adhesive tape as defined in claim 16 wherein said polyacrylic-functional crosslinking monomer was trimethyolpropane triacrylate.

18. Pressure-sensitive adhesive tape as defined in claim 16 wherein said polyacrylic-functional crosslinking monomer was pentaerythritol tetracrylate.

19. Pressure-sensitive adhesive tape as defined in claim 16 wherein said polyacrylic-functional crosslinking monomer was 1,2-ethylene glycol diacrylate.

* * * * *